(12) United States Patent
Horn (10) Patent No.: US 10,683,021 B2
(45) Date of Patent: Jun. 16, 2020

(54) METHOD FOR OPERATING A RAIL VEHICLE ALONG A RAILWAY LINE

(71) Applicant: SIEMENS MOBILITY GMBH, Munich (DE)

(72) Inventor: Stephan Horn, Erlangen (DE)

(73) Assignee: Siemens Mobility GmbH, Munich (DE)

(\*) Notice: Subject to any disclaimer, the term of this patent is extended or adjusted under 35 U.S.C. 154(b) by 14 days.

(21) Appl. No.: 15/781,190

(22) PCT Filed: Nov. 8, 2016

(86) PCT No.: PCT/EP2016/076913
§ 371 (c)(1),
(2) Date: Jun. 4, 2018

(87) PCT Pub. No.: WO2017/092974
PCT Pub. Date: Jun. 8, 2017

(65) Prior Publication Data
US 2018/0319412 A1    Nov. 8, 2018

(30) Foreign Application Priority Data

Dec. 4, 2015   (DE) .................... 10 2015 224 328

(51) Int. Cl.
*B61L 3/00* (2006.01)
*B61L 27/00* (2006.01)
(Continued)

(52) U.S. Cl.
CPC .......... *B61L 3/006* (2013.01); *B60T 8/1705* (2013.01); *B60T 13/665* (2013.01);
(Continued)

(58) Field of Classification Search
CPC ...... B61L 3/006; B61L 3/008; B61L 27/0027; B60T 8/1705; B60T 13/665; B60T 17/228; B60T 8/3235
(Continued)

(56) References Cited

U.S. PATENT DOCUMENTS

2005/0223933 A1\* 10/2005 Crosbie .................... B61B 1/02
                                                                         104/31
2010/0292875 A1    11/2010 Gross

FOREIGN PATENT DOCUMENTS

AU    2013311590 A1    4/2015
DE    102012108395 A1    3/2014
(Continued)

*Primary Examiner* — Gertrude Arthur Jeanglaude
(74) *Attorney, Agent, or Firm* — Laurence Greenberg; Werner Stemer; Ralph Locher (57) ABSTRACT

A method operates a rail vehicle along a railway line. Accordingly, a trip of the rail vehicle has a travel section along the railway line, which travel section ends before or at a hazard point of the railway line. The rail vehicle, in a protection mode, is braked starting from a first speed during a braking phase at the start of the travel section. During the braking phase, a kinetic quantity of the kinetic energy amount of the rail vehicle is absorbed by an energy absorption unit. The braking phase is followed by an energy dissipation phase, in which part of the absorbed energy is discharged. The travel section is defined such that an energy state parameter representative of a vehicle energy amount, which energy state parameter takes into account the energy amount present in the energy absorption unit, satisfies a condition at the hazard point.

17 Claims, 3 Drawing Sheets

(51) Int. Cl.
   *B60T 8/17* (2006.01)
   *B60T 13/66* (2006.01)
   *B60T 17/22* (2006.01)
   *B60T 8/32* (2006.01)

(52) U.S. Cl.
   CPC ............ *B60T 17/228* (2013.01); *B61L 3/008* (2013.01); *B61L 27/0027* (2013.01); *B60T 8/3235* (2013.01)

(58) Field of Classification Search
   USPC .......................................................... 701/19
   See application file for complete search history.

(56) References Cited

FOREIGN PATENT DOCUMENTS

| | | |
|---|---|---|
| DE | 102014002040 A1 | 8/2015 |
| DE | 102014203751 A1 | 9/2015 |
| RU | 2422307 C2 | 6/2011 |
| WO | 2015128147 A1 | 9/2015 |

\* cited by examiner

METHOD FOR OPERATING A RAIL VEHICLE ALONG A RAILWAY LINE

BACKGROUND OF THE INVENTION

Field of the Invention

The invention relates to a method for operating a rail vehicle along a railway line.

Safety-related aspects play a pivotal role in the configuration of a rail vehicle. Today's rail vehicles are conventionally configured in such a way that they are able to deal with as many hazard situations as possible by means of suitable technical safety measures. For the configuration, in particular in respect of the braking device that is crucial with regard to safety, the conventional approach is to assume the most critical conceivable travel situation in which a multiplicity of unfavorable circumstances occur simultaneously. For example, the rail vehicle is required to be capable of handling a travel situation at maximum speed under a critical load and on a critical track grade. However, a configuration suitable for this leads to overdimensioning as well as to high overheads in terms of construction and costs.

Rail vehicles typically possess a train protection unit which initiates safety measures when an imminent hazard situation is detected, in particular when a danger point, hereinafter referred to as a "hazard point", is detected on the section of track on which the train is traveling. When initiating restrictive measures for train operation, conventional train protection units proceed on the assumption of the above-cited most critical conceivable danger situation. In most application scenarios, the measures adopted are therefore not adapted to fit the actual travel situation, in particular being too restrictive in relation to the real travel situation.

SUMMARY OF THE INVENTION

The object underlying the invention is to provide a method for operating a rail vehicle along a railway line by means of which said disadvantages may be avoided.

To that end, it is proposed that a journey of the rail vehicle along the railway line includes a travel section which ends before or at a hazard point of the railway line, the rail vehicle—in a protection mode—is braked, starting from a first speed, at the start of the travel section during a braking phase, a kinetic quantity of the kinetic energy of the rail vehicle is absorbed by an energy absorption unit of the rail vehicle during the braking phase, the braking phase is followed by an energy dissipation phase in which at least a portion of the absorbed energy is discharged by the energy absorption unit, and the travel section is defined in such a way that an energy state parameter which is representative of a vehicle energy and which takes into account at least the energy present in the energy absorption unit satisfies a condition at the hazard point. This enables a preventive and adaptive operating behavior of the rail vehicle to be achieved, wherein the definition of the operating behavior takes into account an energy state of the rail vehicle. In particular, the operating behavior can be adapted at least to fit the actual state of the energy absorption unit. The configuration of the rail vehicle, in particular of the energy absorption unit, no longer needs to be adapted to fit the most critical conceivable hazard situation, as with the conventional approach, since the operating behavior can be adapted in such a way as to avoid the occurrence of a prohibited travel situation. Furthermore, by taking the energy state into account it is possible for the initiation of restrictive measures to be more effectively adapted to said energy state.

The definition of the travel section comprises in particular at least determining the parameters that serve to define the operating behavior of the rail vehicle in the travel section, in particular to define the at least one braking phase and the at least one energy dissipation phase. For example, the definition may comprise at least the determination of the start and end point of the braking phase on the section of track, a target speed that is to be reached at the end of the braking phase, and the energy dissipation distance provided for the energy dissipation phase.

The rail vehicle that reaches a target speed at the end of the braking phase is preferably operated at a constant speed during the energy dissipation phase following the braking phase.

The travel section comprises at least the braking phase and the energy dissipation phase following on therefrom. This may be followed by a second braking phase in the travel section, said second braking phase in turn being followed by a second energy dissipation phase. A subsequent acceleration during the travel section is beneficially prevented.

A characteristic variable that is "representative" "of" a parameter, or, to put it another way, a characteristic variable "for" a parameter, may be the parameter itself or a quantity from which the value of the parameter may be unequivocally derived. The characteristic variable and the associated parameter may be different physical quantities. For example, an electrical quantity can be representative of a temperature.

The hazard point can correspond to the start of a down-gradient section.

In a preferred embodiment of the invention it is proposed that the state parameter takes into account the current mass of the rail vehicle. A further improvement in the adjustment of the operating behavior to fit actual circumstances, such as e.g. an overload or low load of the rail vehicle, can be achieved as a result.

The state parameter is beneficially representative of the vehicle energy resulting from the kinetic energy and the potential energy of the rail vehicle and the energy present in the energy absorption unit, as a consequence of which an advantageous adjustment of the operating behavior to match the actual travel circumstances can be achieved.

The "potential energy" of the rail vehicle is dependent on a difference in elevation which corresponds to the difference between the level of the current track position of the rail vehicle and the level of the point on the section of track at which the rail vehicle would come to a stop following braking at the maximum available braking power (also known as emergency braking). In other words, this energy corresponds to the potential energy which—in the case of a positive contribution—must be overcome by the rail vehicle during the braking operation or—in the case of a negative contribution—supports the braking operation. By "elevation" is to be understood in particular the geographical elevation relative to sea level.

In an advantageous embodiment of the invention, the condition requires that the vehicle energy at the hazard point corresponds to a predefined maximum permitted vehicle energy or falls below said permitted maximum. The definitive energy level for the configuration of the rail vehicle, in particular the configuration of the energy absorption unit, can be fixed at a lower threshold compared to known solutions, since the occurrence of travel situations that are unallowable in energy terms can be avoided by means of an adaptive operating behavior. The maximum permitted energy beneficially corresponds to the maximum energy that can be absorbed by the energy absorption unit by reason of its construction.

In a preferred embodiment, the energy absorption unit comprises at least one set of elements which are provided for absorbing energy in the form of heat. A maximum energy that can be absorbed by said set corresponds to a maximum energy volume which can be absorbed by said elements, starting from a situation in which the elements are at the ambient temperature, without this leading to a serious degradation of functionality, in particular to a destruction of the elements. The maximum energy volume is therefore dependent on the thermal load-bearing capacity of the elements. The energy dissipation phase for said set corresponds to a cooling-down phase in which the absorbed energy is discharged to a further system, e.g. the ambient air.

The energy absorption unit may in this case comprise a set of braking device components of the rail vehicle which absorb at least a portion of the kinetic quantity, in particular the kinetic quantity, in the form of heat.

These components may be components of a friction brake, wherein elements of the energy absorption unit that are subject to heat buildup in this case correspond e.g. to brake disks and wheel disks of the rail vehicle. The maximum energy volume that can be absorbed by said elements corresponds to the amount that can be absorbed before serious changes in frictional contact, and therefore in the effected braking force, occur. Said maximum energy volume is defined by the brake disk design and a given lining type.

Alternatively or in addition, said components may be components of an electric brake, wherein elements of the energy absorption unit that are subject to heat buildup in this case correspond e.g. to braking resistors. The maximum energy volume that can be absorbed by said elements is in this case likewise dictated by design characteristics.

In a further alternative or additional embodiment, said components may be components of a retarder brake, wherein an element of the energy absorption unit that is subject to heat buildup is in this case formed by a retarder element, in particular a retarder fluid.

In a further alternative or additional embodiment, said components may be components of an eddy-current brake, wherein an element of the energy absorption unit that is subject to heat buildup in this case corresponds to a component in which eddy currents are induced.

By a release or "discharge" of energy absorbed by the energy absorption unit is to be understood a transfer of energy from the energy absorption unit to a system in such a way that said energy contributes neither to the kinetic energy nor to the potential energy of the rail vehicle. In the case of a cooling-down process, said system may be a cooling unit or the ambient air. The discharged energy may also be stored and/or utilized for operation of an energy-consuming load.

In this connection it is proposed that the current value of the energy state parameter is acquired, the energy state parameter at the hazard point is extrapolated starting from the current value, and the protection mode is initiated if the extrapolated state parameter does not satisfy the condition. If the condition is satisfied, the journey may be continued without change, in particular without a braking intervention. The extrapolation is performed in particular on the assumption that the current driving pattern, in particular the current speed, is maintained.

In order to acquire the current value of the energy state parameter, at least characteristic variables for the actual position, the actual speed, the mass, and the energy state of the energy absorption unit are beneficially measured. In the case of elements of the energy absorption unit that are provided for absorbing energy through heat retention, a characteristic variable for the energy state may be a temperature parameter. Data relating to the stopping power of the rail vehicle may also be taken into account, in particular for the extrapolation. Said data may correspond e.g. to stopping power data entered during the process called "train data input" prior to departure. In this case an input can be made in the form of a braking power percentage.

Furthermore, the extrapolation is advantageously performed on the basis of railway line data that includes at least an elevation profile of the railway line, the hazard point corresponding to the start of a down-gradient section.

If, as described above, the condition requires that the vehicle energy at the hazard point corresponds to a predefined maximum permitted vehicle energy or falls below said threshold, a characteristic quantity for the energy difference between the maximum permitted vehicle energy and the extrapolated vehicle energy at the hazard point is beneficially determined on the basis of the extrapolated state parameter.

Defining the travel section in the protection mode beneficially comprises calculating a target speed that is to be reached at the end of the braking phase.

If, as described above, a characteristic quantity is determined for the energy difference between the maximum permitted vehicle energy and the extrapolated vehicle energy at the hazard point, the target speed is dependent on the energy difference.

In this connection it is proposed that the target speed is calculated in such a way that it produces a kinetic energy and a potential energy at the hazard point, the sum of which is less than the maximum permitted vehicle energy at least by the quantity of the energy difference.

A first mode of the protection mode is proposed in which at least the kinetic quantity is dissipated as an energy dissipation quantity during the energy dissipation phase. If the target speed is calculated such that it produces a kinetic energy and a potential energy at the hazard point, the sum of which is less than the maximum permitted vehicle energy by the quantity of the energy difference, said speed represents, for this first mode, a ceiling for the target speed to be set during the braking phase. By this means it is possible to achieve a minimum speed restriction compared to further adaptation scenarios.

According to a second mode of the protection mode, the target speed is calculated in such a way that less energy than the kinetic quantity is dissipated as an energy dissipation quantity during the energy dissipation phase. In this case a shorter energy dissipation distance can be achieved than in the first mode if a target speed below the above-cited ceiling is set. By this means it is possible for such a target speed to produce a kinetic energy and a potential energy at the hazard point, the sum of which is less than the maximum permitted vehicle energy by more than the energy difference, with the result that a complete dissipation of the kinetic quantity during the energy dissipation phase is not necessary.

Defining the travel section in the protection mode comprises in particular calculating the energy dissipation phase distance required for the energy dissipation phase as a function of an energy dissipation quantity on the basis of a cooling capacity characteristic curve of the energy absorption unit.

Defining the travel section in the protection mode beneficially comprises calculating the braking phase distance required for establishing the target speed as a function of the stopping power data of the rail vehicle.

It is furthermore proposed that the traction unit driver is prompted in a prompt mode to initiate the braking phase at the start of the travel section. In this case the operating behavior is advantageously adjusted on the basis of a service braking operation initiated by the traction unit driver, which is executed with moderate braking deceleration. This reduces material wear and tear and—in the case of a rail vehicle provided for the transportation of passengers—is of advantage in terms of passenger comfort.

Alternatively or in addition, the braking phase can be initiated automatically by a train protection unit in a forced intervention mode. In this case the brakes can be operated with the maximal available braking power. The forced intervention mode can be applied in particular if an inadequate response to the prompting in the prompt mode is detected. An inadequate response in this context can be a failure to respond or the initiation of a braking operation with insufficient braking power.

A high level of safety may furthermore be achieved if the rail vehicle is braked to a standstill in an emergency mode, the emergency mode being initiated if the presence of a fault is detected in the energy dissipation phase. A fault of said kind can be detected in particular by the monitoring of the energy absorption unit. If the latter has a set of elements that are provided for absorbing energy in the form of heat, a fault can be detected in particular on the basis of the temperature profile of the elements. In particular, a cooling capacity characteristic curve of the elements can be used for this purpose.

BRIEF DESCRIPTION OF THE SEVERAL VIEWS OF THE DRAWING

Exemplary embodiments of the invention are explained in more detail with reference to the drawings, in which.

DESCRIPTION OF THE INVENTION

Figure 1:
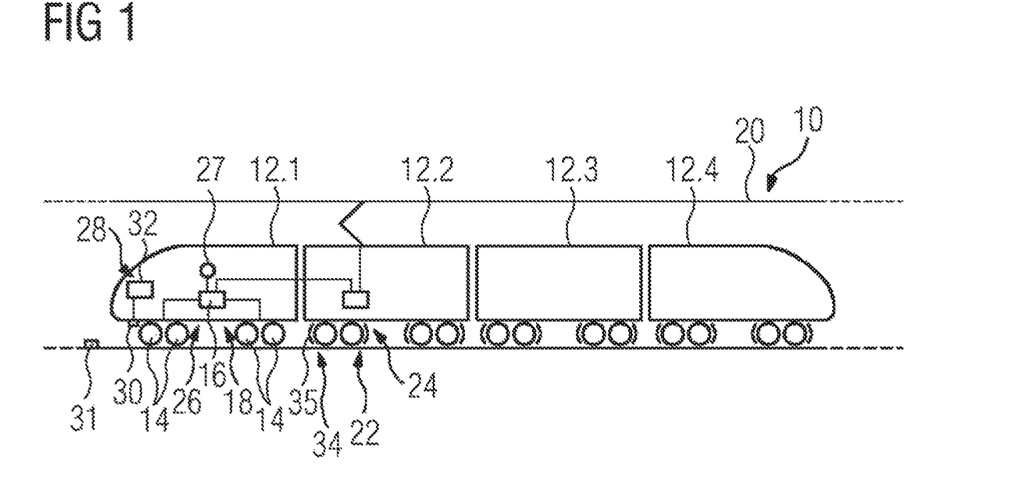
FIG. 1: shows a rail vehicle having a train protection unit in a schematic side view.

FIG. 1 shows a rail vehicle 10 in a schematic side view. It is embodied for example as a consist of coaches 12 that are provided for the transportation of passengers, at least one coach 12.1 being embodied as a motor coach. The motor coach 12.1 has driving axles 14 which can be driven by at least one drive motor (not shown). The drive motor and a power supply unit 16 provided in order to supply said drive motor with electrical power form a drive unit 18. The latter draws electrical energy from an external voltage supply 20. The rail vehicle 10 further has a braking device 22. The latter comprises at least one electrically and/or mechanically actuatable brake unit 24 (shown schematically), which is embodied as a friction brake unit, and an electric brake unit 26, which is formed by the drive unit 18. The brake unit 26 is able to feed back an amount of electrical energy generated in a braking operation into the external voltage supply 20 and/or to convert said energy into heat in braking resistors 27. The embodiment of the brake unit 24 with a friction brake unit is exemplary. Alternatively or in addition to the latter, the brake unit 24 may have at least one retarder brake and/or at least one eddy-current brake, in which brakes kinetic energy of the rail vehicle 10 is likewise converted into heat.

The layout of a drive unit 18 and a braking device 22 in a rail vehicle is sufficiently well-known and will not be explained in greater detail here.

The considered embodiment of the rail vehicle 10 comprising the consist of coaches 12—i.e. an embodiment as a formation known as a multiple unit trainset—is exemplary. In an alternative embodiment, the rail vehicle 10 may be embodied as a single traction vehicle, such as e.g. a locomotive, which is provided for operational deployment with driveless railway passenger cars or freight cars. The drawing of electrical energy from an external voltage supply 20 is likewise exemplary. In a further exemplary embodiment, the rail vehicle 10 may be equipped with its own dedicated energy source, such as in particular a combustion engine, which drives the driving axles 14 or by means of which electrical energy is generated for the power supply unit 16.

The rail vehicle 10 further comprises a train protection unit 28. This has a unit 30 which is provided for interaction with trackside systems 31, and a controller 32. The unit 30 comprises in particular a train antenna. If defined operating situations are present, the interaction between the trackside systems 31 and the train protection unit 28 can trigger an intervention of the train protection unit 28 in the control of the rail vehicle 10. Thus, if e.g. a maximum permitted speed is exceeded or if a main signal indicating halt is passed without authority, the train protection unit 28 can initiate a forced braking of the rail vehicle 10. Known train protection systems are e.g. the PZB system ("Punktuelle Zugbeeinflussung"=spot or intermittent automatic train running control), LZB ("Linien-Zug-Beeinflussung"=linear or continuous automatic train running control), ATP (Automatic Train Protection), TBL (Transmission Balise-Locomotive train protection system), ATB (Automatische treinbeinvloeding automatic train protection system) and the ETCS system (European Train Control System).

The operation of the train protection unit 28 is based on train information which is dependent on the configuration of the rail vehicle 10 and on the current operating states of its equipment. In particular, prior to an entry into service of the rail vehicle 10, information relating to its stopping power must be communicated to the train protection unit 28 (a process known as "train data input"). This information is evaluated by the train protection unit 28, in particular in order to take a stopping distance into account.

Figure 2:
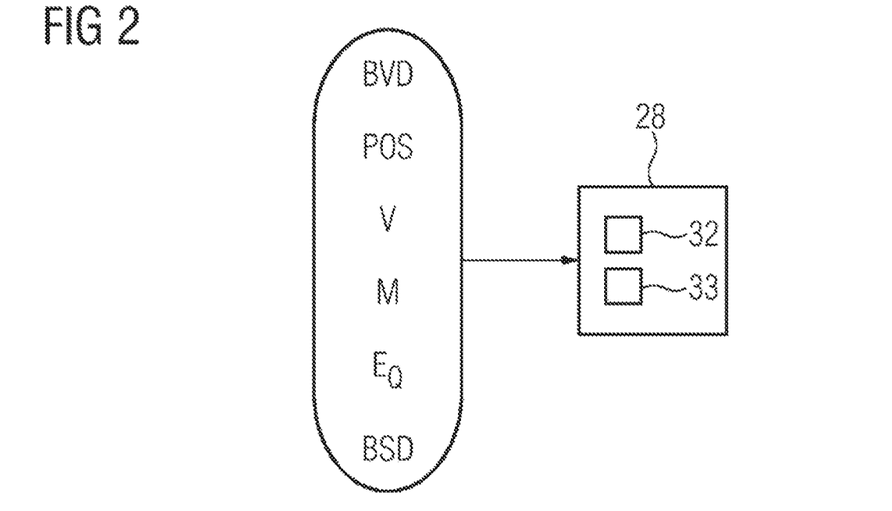
FIG. 2: shows the train protection unit and information taken into account by said unit.

FIG. 2 shows an overview of the information that is taken into account by the train protection unit 28 in order to perform the methods described in more detail below. As well as the already mentioned information BVD relating to the stopping power, data BSD of the railway line on which the rail vehicle is to travel, at least one set of information POS relating to the actual position of the rail vehicle 10 and at least one set of information V relating to the current speed of the rail vehicle 10 are taken into account in addition. At least one set of information M relating to the loading of the rail vehicle 10 and at least one set of information $E_Q$ relating to a heat quantity contained in the braking device 22 are also taken into account. This information $E_Q$ can be obtained in particular from the evaluation of a temperature parameter for a temperature of the braking device 22.

In order to implement the below-described operating modes, the controller 32 of the train protection unit 28 is equipped with at least one computing unit (not shown) and at least one memory unit 33, in which corresponding executable programs are stored.

The sets of information BVD and BSD are beneficially stored in a database (not shown in further detail) of the rail vehicle 10, to which database the train protection unit 28 has access. The sets of information POS, V, M and EQ are usually captured by way of corresponding sensor units (not shown in further detail).

The components of the braking device 22 which absorb at least a portion of the kinetic energy of the rail vehicle 10 in a braking operation form an energy absorption unit 34. In particular, components 35 (FIG. 1) of the brake unit 24 embodied as a friction brake unit, in particular brake disks, form elements of the energy absorption unit 34 which are provided for absorbing energy through heat retention. In the case of the aforementioned alternative embodiments of the brake unit 24, said energy absorption unit 34, where appropriate, also comprises components of a retarder brake or of an eddy-current brake and/or the braking resistors 32 of the electric brake unit 26. The information $E_Q$ forms a state parameter of the energy absorption unit 34 which is characteristic of the energy state of the energy absorption unit 34. This information $E_Q$ corresponds in particular to the sum of the energy volumes contained in the elements of the energy absorption unit 34.

Figure 3:
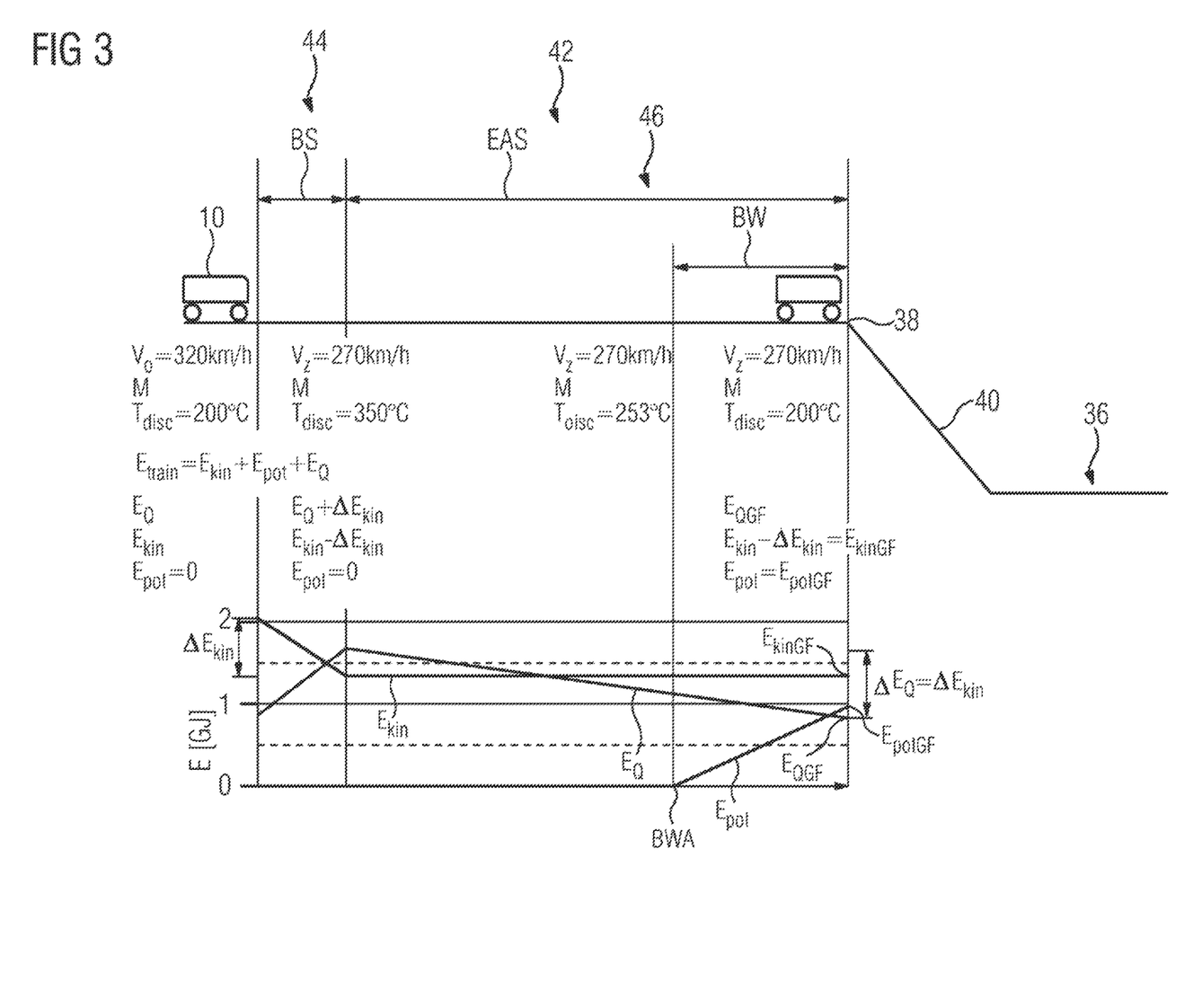
FIG. 3: shows a travel section of the rail vehicle from FIG. 1 according to a first operating mode of the train protection unit.

FIG. 3 shows a first diagram with reference to which a method performed by the train protection unit 28 for operating the rail vehicle 10 along a railway line 36 is explained.

The railway line 36 has a hazard point 38 corresponding to the start of a down-gradient section 40 of said railway line 36. The approaching of the hazard point 38 is determined on the basis of the data BSD as track section information. To that end, said data BSD comprises at least an elevation profile, which is shown in the diagram.

The rail vehicle 10 is furthermore characterized by a maximum permitted energy $E_{max}$. In particular, the maximum permitted energy corresponds to the maximum energy that can be absorbed by the braking device 22 as a function of its configuration. Said maximum energy is specified in advance and is critical to the configuration of the braking device 22.

The maximum permitted energy $E_{max}$, and therefore the configuration of the braking device 22, can be chosen in such a way that the vehicle energy $E_{train}$ is less than $E_{max}$ in all conceivable travel situations. The "most unfavorable" energy state of the rail vehicle 10 is critical in this case for defining the energy $E_{max}$. It is assumed in this regard that the rail vehicle 10 is traveling at the maximum speed, has a critical mass and is located in a track section having a critical track grade. However, this imposes high demands on the braking device 22 in terms of its construction and, if necessary, an overdimensioning of the same, in particular in respect of permitted temperatures and energy absorption capacities of the brake components.

In an alternative embodiment described in the present text, the maximum permitted energy $E_{max}$ may be fixed at a lower level, thereby enabling the braking device 22 to be implemented in a simpler configuration in terms of its construction.

As the rail vehicle 10 travels along the railway line 36, an energy state parameter representative of the vehicle energy $E_{train}$ is determined continuously or at regular time intervals. A criterion applicable to the operation of the rail vehicle 10 in that case is that the current vehicle energy $E_{train}$ must not exceed the maximum permitted energy $E_{max}$. This situation could occur in particular if the rail vehicle 10 is overloaded, i.e. has a mass exceeding a predefined maximum mass, is traveling along a down-gradient section having an incline exceeding a predefined maximum track grade, and/or if elements of the energy absorption unit 34 that are provided for absorbing energy through heat retention are already in a preheated state.

The energy state parameter is representative of the vehicle energy $E_{train}$ resulting from the kinetic energy $E_{kin}$, the potential energy $E_{pot}$ and the energy $E_Q$ contained in the energy absorption unit 34. The aforementioned sets of information M, V, BSD, POS, BVD and $E_Q$ are therefore referred to in order to determine said variable. In the exemplary embodiment under consideration, the energy state parameter corresponds to the vehicle energy $E_{train}$ itself. In a further embodiment, a variable from which the vehicle energy $E_{train}$ can unequivocally be derived can be chosen for the state parameter.

The current potential energy $E_{pot}$ of the rail vehicle 10 is defined by the mass M of the rail vehicle 10 and a difference in elevation. In this case the latter corresponds to the difference in elevation between the current actual position POS of the rail vehicle 10 and the position on the section of track at which the rail vehicle 10 would come to a stop if an emergency braking operation were to be initiated at the maximum available braking power at the actual position POS.

Starting from the current vehicle energy $E_{train}$, the vehicle energy $E_{trainGF}$ at the hazard point 38 is extrapolated. The extrapolation is based on the assumption that the current driving pattern is maintained up to the hazard point 38. Due to the down-gradient section 40, the vehicle energy $E_{trainGF}$ at the hazard point 38 is greater by the quantity of a potential energy. This potential energy is dependent on the mass M of the rail vehicle 10 and the difference in elevation between the hazard point 38 and the point on the section of track at which the rail vehicle 10 would come to a stop if the brakes were to be applied with the maximum available power, starting at the hazard point 38. In an extreme case, the difference in elevation may correspond to the entire difference in elevation of the down-gradient section 40.

If the vehicle energy $E_{trainGF}$ at the hazard point 38 exceeds the maximum permitted energy $E_{max}$, a protection mode comprising the below-described measures is initiated by the train protection unit 28. If the extrapolated vehicle energy $E_{trainGF}$ is at a permitted level, the driving pattern can be maintained up to the hazard point 38.

The protection mode that is to be initiated is aimed at bringing the rail vehicle 10 into an energy state at which the condition $E_{train} \leq E_{max}$ is satisfied at the hazard point 38 at the latest.

To that end, a travel section 42 which ends at the latest at the hazard point 38 is defined by the train protection unit 28. The travel section 42 is defined in such a way that the vehicle energy $E_{train}$ at the hazard point 38 corresponds to the maximum permitted energy $E_{max}$ or is less than the latter. The travel section 42 is defined by determining its starting point and by a driving pattern of the rail vehicle 10 which brings the rail vehicle 10 into the desired energy state.

The driving pattern in the defined travel section 42 comprises a braking phase 44 in which the rail vehicle 10 is braked, starting from a first speed $V_0$, until a target speed $V_Z$ is reached. Defining the travel section 42 comprises in particular determining the target speed $V_Z$.

It is assumed that the difference between the extrapolated vehicle energy $E_{trainGF}$ and the maximum permitted energy $E_{max}$ corresponds to an energy difference $\Delta E$.

In a first mode of the protection mode, shown in the diagram of FIG. 3, the target speed $V_Z$ is calculated in such a way that the kinetic energy $E_{kin}$ of the rail vehicle 10 during the braking phase 44 is reduced by a kinetic quantity $\Delta E_{kin}$ and the target speed $V_Z$ produces a kinetic energy $E_{kinGF}$ and a potential energy $E_{potGF}$ at the hazard point 38, the sum of which is less than the maximum permitted energy $E_{max}$ by the energy difference $\Delta E$.

It should be noted at this juncture that the potential energy $E_{potGF}$ at the hazard point 38 is dependent on the target speed $V_Z$. At a low target speed $V_Z$, the stopping distance necessary between the brakes being applied at the hazard point 38 and the rail vehicle 10 coming to a standstill is less than at a higher target speed $V_Z$. At the low target speed $V_Z$, the stopping distance therefore ends at a higher point in the down-gradient section 40 which has a smaller difference in elevation relative to the hazard point 28 than a lower stopping distance end point brought about due to a higher speed.

The last point in the travel section 42 from which an emergency braking operation can be initiated which, at the current target speed $V_Z$, would lead to a standstill at the hazard point 38, is designated by the reference sign BWA, which forms the start of a stopping distance BW up to the hazard point 38. From said point BWA, the potential energy $E_{pot}$ increases continuously until it reaches the value $E_{potGF}$ at the hazard point 38.

To ensure the vehicle energy $E_{train}$ at the hazard point 38 amounts at a maximum to the permitted energy $E_{max}$, the braking phase 44 must be followed by an energy dissipation phase 46 in which at least the kinetic quantity $\Delta E_{kin}$ absorbed by the energy absorption unit 34 is discharged by the latter to the environment. This energy dissipation phase 46 corresponds in particular to a cooling-down phase of brake components of the braking device 22 which are elements of the energy absorption unit 34. The energy dissipated by the energy absorption unit 34 is called the energy dissipation quantity $\Delta E_Q$. This corresponds in this first mode to the kinetic quantity $\Delta E_{kin}$.

Figure 4:
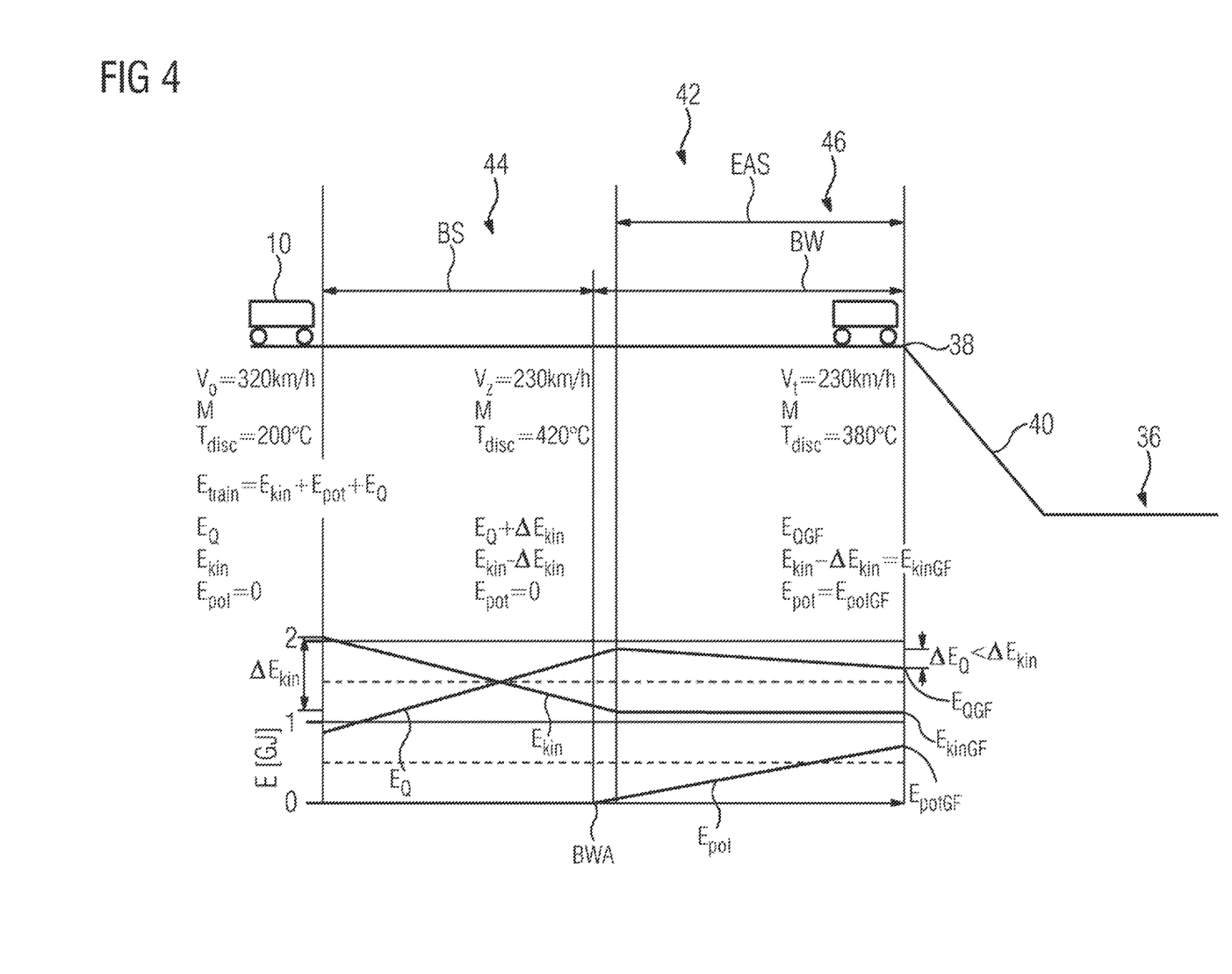
FIG. 4: shows a travel section of the rail vehicle from FIG. 1 according to a second operating mode of the train protection unit.

In a second mode of the protection mode, shown in the diagram of FIG. 4, the target speed $V_Z$ is calculated in such a way that less energy than the kinetic quantity $\Delta E_{kin}$ is dissipated during the energy dissipation phase 46 as the energy dissipation quantity $\Delta E_Q$. To that end, the target speed $V_Z$ is calculated in such a way that the sum of the kinetic energy $E_{kinGF}$ and the potential energy $E_{potGF}$ at the hazard point 38 is less than the maximum permitted vehicle energy $E_{max}$ by more than the energy difference $\Delta E$. At the hazard point 38, the surplus energy by which the vehicle energy is reduced may still be contained in the energy absorption unit 34. The energy dissipation distance EAS may therefore be shortened compared to the first mode.

Defining the travel section 42 in the cited modes additionally comprises determining the braking distance BS for the braking phase 44 and the energy dissipation phase distance EAS for the energy dissipation phase 46. For this, at least the starting point of the respective phase is defined in each case. The energy dissipation distance EAS is calculated as a function of the energy dissipation quantity $\Delta E_Q$ on the basis of a cooling capacity characteristic curve of the energy absorption unit 34. Information relating to the cooling behavior of the energy absorption unit 34 or of individual elements of the latter can be derived from said cooling capacity characteristic curve. In a special example, a time for reaching a specific temperature reduction can be determined from the cooling capacity characteristic curve. On this basis, and with knowledge of the current speed V, normally the target speed $V_Z$, it is possible to calculate the energy dissipation distance EAS. The braking distance 44 is calculated on the basis of the aforementioned information BVD relating to the stopping power of the rail vehicle 10 and the current speed V.

In order to initiate the braking phase 44 at the start of the travel section 42, the traction unit driver is prompted by the train protection unit 28—e.g. by way of a display unit—to brake the rail vehicle 10 to the specified target speed $V_Z$. The braking distance BS is determined on the basis of braking deceleration values BVD that find application during a normal service braking operation.

If it is detected by the train protection unit 28 that no response or an inadequate response on the part of the traction unit driver is present, e.g. a braking operation is initiated with insufficient braking deceleration, a braking operation to establish the target speed $V_Z$ is initiated automatically by the train protection unit 28 in a forced intervention mode. The braking distance BS is determined on the basis of braking deceleration values that find application during an emergency braking operation.

In addition, the train protection unit 28 has an emergency mode in which the brakes are applied until the rail vehicle 10 comes to a standstill. This emergency mode is initiated if it is detected by the train protection unit 28 that the braking phase 44 is executed incorrectly in the forced intervention mode—e.g. at too low a deceleration—or not at all. The emergency mode is also initiated if, following the braking phase 44, the presence of a fault is detected in the energy dissipation phase 46. This can be recognized e.g. by the fact that a temperature profile of components of the energy absorption unit 34 deviates from a temperature profile determined on the basis of a cooling capacity characteristic curve.

The invention claimed is:

1. A method for operating a rail vehicle along a railway line, a journey of the rail vehicle along the railway line includes a travel section ending before or at a hazard point of the railway line, which comprises the steps of:
   braking the rail vehicle, after receiving a protection mode signal, starting from a first speed, at a start of the travel section during a braking phase, during the braking phase, a quantity of kinetic energy of the rail vehicle is absorbed by an energy absorption unit of the rail vehicle;
   following the braking phase with an energy dissipation phase in which at least a portion of absorbed energy is discharged by the energy absorption unit; and
   defining the travel section in such a way that an energy state parameter, which is representative of vehicle energy and which takes into account at least energy present in the energy absorption unit, satisfies a maximum permitted vehicle energy condition at the hazard point.

2. The method according to claim 1, wherein the energy state parameter takes into account a current mass of the rail vehicle.

3. The method according to claim 1, wherein the energy state parameter is representative of the vehicle energy resulting from the kinetic energy and a potential energy of the rail vehicle and the energy present in the energy absorption unit.

4. The method according to claim 1, wherein the energy absorption unit contains braking device components of the rail vehicle that absorb at least a portion of the kinetic energy in a form of heat, wherein the energy dissipation phase corresponds to a cooling-down phase of the braking device components.

5. The method according to claim 1, which further comprises:
acquiring a current value of the energy state parameter;
extrapolating the energy state parameter at the hazard point starting from the current value; and
generating the protection mode signal if an extrapolated state parameter does not satisfy the condition.

6. The method according to claim 5, which further comprises performing an extrapolation on a basis of data of the railway line that includes at least an elevation profile of the railway line, wherein the hazard point corresponds to a start of a down-gradient section.

7. The method according to claim 5, wherein the defining of the travel section in the protection mode comprises calculating a target speed that is to be reached at an end of the braking phase.

8. The method according to claim 7, which further comprises determining a characteristic quantity for an energy difference between the maximum permitted vehicle energy and extrapolated vehicle energy at the hazard point on a basis of the extrapolated state parameter, wherein the target speed is dependent on the energy difference.

9. The method according to claim 8, which further comprises calculating the target speed in such a way that the target speed produces kinetic energy and potential energy at the hazard point, a sum of which is less than the maximum permitted vehicle energy at least by a quantity of the energy difference.

10. The method according to claim 9, wherein in a first mode, dissipating at least the quantity of kinetic energy as an energy dissipation quantity during the energy dissipation phase.

11. The method according to claim 10, wherein in a second mode, calculating the target speed in such a way that less energy than the quantity of kinetic energy is dissipated as the energy dissipation quantity during the energy dissipation phase.

12. The method according to claim 1, wherein the step of defining the travel section in the protection mode includes calculating an energy dissipation phase distance required for the energy dissipation phase in dependence on an energy dissipation quantity on a basis of a cooling capacity characteristic curve of the energy absorption unit.

13. The method according to claim 1, wherein in a prompt mode, prompting a traction unit driver to initiate the braking phase at the start of the travel section.

14. The method according to claim 13, wherein in a forced intervention mode, initiating the braking phase automatically by a train protection unit.

15. The method according to claim 14, which further comprises detecting an inadequate response to the prompting in the prompt mode and the forced intervention mode is applied.

16. The method according to claim 1, wherein in an emergency mode, applying vehicle brakes until the rail vehicle comes to a standstill, the emergency mode is initiated if a presence of a fault is detected in the energy dissipation phase.

17. A train protection unit, comprising:
a controller operating a rail vehicle along a railway line, a journey of the rail vehicle along the railway line includes a travel section ending before or at a hazard point of the railway line, said controller programmed to:
brake the rail vehicle, after receiving a protection mode signal, starting from a first speed, at a start of the travel section during a braking phase, during the braking phase, a quantity of kinetic energy of the rail vehicle is absorbed by an energy absorption unit of the rail vehicle;
follow the braking phase with an energy dissipation phase in which at least a portion of absorbed energy is discharged by the energy absorption unit; and
define the travel section in such a way that an energy state parameter, which is representative of vehicle energy and which takes into account at least energy present in the energy absorption unit, satisfies a maximum permitted vehicle energy condition at the hazard point.

* * * * *